United States Patent
Wang et al.

(10) Patent No.: US 7,598,360 B2
(45) Date of Patent: Oct. 6, 2009

(54) BISSTYRYL COMPOUND AND HIGH DENSITY RECORDING MEDIA UTILIZING THE SAME

(75) Inventors: Shin-Shin Wang, Hsinchu (TW); Chien-Wen Chen, Pingtung County (TW); Jong-Lieh Yang, Hsinchu (TW); Chii-Chang Lai, Taichung Hsien (TW); Hui-Ping Tsai, Hsinchu (TW); Wen-Ping Chu, Taichung (TW); Wen-Yih Liao, Taichung (TW); Chien-Liang Huang, Taoyuan County (TW); Tzuan-Ren Jeng, Hsinchu (TW); Ching-Yu Hsieh, Hsinchu County (TW); An-Tse Lee, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 130 days.

(21) Appl. No.: 11/254,663

(22) Filed: Oct. 21, 2005

(65) Prior Publication Data
US 2007/0009825 A1    Jan. 11, 2007

(30) Foreign Application Priority Data
Jul. 5, 2005    (TW) .............................. 94122690 A (51) Int. Cl.
C07D 403/06    (2006.01)
C07D 401/14    (2006.01)
B32B 3/02    (2006.01)

(52) U.S. Cl. .................. 534/702; 544/124; 544/143; 546/8; 546/176; 546/264; 548/402; 548/455; 428/64.4; 428/64.8; 430/270.19; 430/270.2; 430/270.21; 430/945

(58) Field of Classification Search ............... 534/702; 544/124, 143; 546/8, 176, 264; 548/402, 548/455; 428/64.4, 64.8; 430/270.19, 270.2, 430/270.21, 945
See application file for complete search history.

(56) References Cited

U.S. PATENT DOCUMENTS

| | | | |
|---|---|---|---|
| 2,461,137 A * | 2/1949 | Brooker | 430/579 |
| 6,761,952 B1 * | 7/2004 | Lee et al. | 428/64.1 |
| 6,815,031 B2 | 11/2004 | Huang et al. | |
| 7,390,549 B2 * | 6/2008 | Wang et al. | 428/64.1 |
| 2003/0203148 A1 | 10/2003 | Huang et al. | |

FOREIGN PATENT DOCUMENTS

| | | | |
|---|---|---|---|
| JP | 59-159165 | * | 9/1984 |
| JP | 2003-313447 A | | 11/2003 |
| WO | WO 2008/010433 | * | 1/2008 |

OTHER PUBLICATIONS

Lu et al., Chemical Abstracts, 131:287734, 1999.*
Parida et al., Colloids and Surfaces A: Physicochemical and Engineering Aspects, 134, 249-255, 1998.*
Huang et al., J. Phys. Chem. B, 106, 10041-10050, 2002.*

* cited by examiner

Primary Examiner—Fiona T Powers
(74) Attorney, Agent, or Firm—Birch, Stewart, Kolasch & Birch, LLP (57) ABSTRACT

A bisstyryl compound. The bisstyryl compound has formula (I):

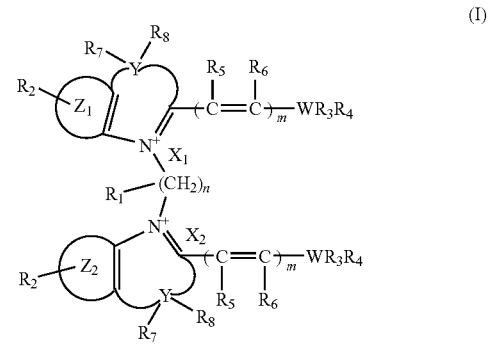

wherein $Z_1$ and $Z_2$ are benzene, naphthalene, or heterocyclic ring, $R_1$ is H, $C_{1-5}$ alkyl, hydroxyl, halogen atoms, or alkoxy, $R_2$ is H, halogen atoms, $C_{1-5}$ alkyl, nitro, ester, carboxyl, sulfo, sulfonamide, sulfuric ester, amide, $C_{1-3}$ alkoxy, amino, alkylamino, cyano, $C_{1-6}$ alkylsulfonyl, or $C_{2-7}$ alkoxy carbonyl, $R_3$, $R_4$, $R_5$, and $R_6$ are H, halogen atoms, alkyl, aralkyl, or heterocyclic ring containing O, S, or N, or $R_3$ and $R_4$ are joined to a nitrogen atom or $R_5$ and $R_6$ are joined together to form a ring, $R_7$ and $R_8$ are H or alkyl, W is nitrogen with or without $Z_1$ and $Z_2$ or aromatic group without $Z_1$ and $Z_2$, Y is carbon, oxygen, sulfur, selenium, —NR, or —C(CH$_3$)$_2$, m is 1-3, n is 1-18, and $X_1$ and $X_2$ are anionic groups or anionic organometallic complexes.

18 Claims, 2 Drawing Sheets

BISSTYRYL COMPOUND AND HIGH DENSITY RECORDING MEDIA UTILIZING THE SAME

BACKGROUND

The present invention relates to a bisstyryl compound, and more specifically to a bisstyryl compound used in a high density recording medium.

With advances in information and multimedia generation, computer, communication, and consumer (3C) electronic products with increased recording density and capacity, microminiaturization, and low cost are demanded. Currently, magnetic recording media are often replaced by high density optical recording media.

Conventional 650 MB CD-R or 4.7 GB DVD-R media are insufficient for 2-hour digital programs, requiring 25-50 GB or more. Blue laser disks with 405 nm read-out wavelength and 25 GB single-layer capacity or more provide a workable option, thus, development of applicable organic dyes is desirable.

SUMMARY

The invention provides a bisstyryl compound having formula (I):

wherein $Z_1$ and $Z_2$ are the same or different and comprise benzene, naphthalene, or heterocyclic ring containing O, S, or N, $R_1$ is H, $C_{1-5}$ alkyl, hydroxyl, halogen atoms, or alkoxy, $R_2$ is H, halogen atoms, $C_{1-5}$ alkyl, nitro, ester, carboxyl, sulfo, sulfonamide, sulfuric ester, amide, $C_{1-3}$ alkoxy, amino, alkylamino, cyano, $C_{1-6}$ alkylsulfonyl, or $C_{2-7}$ alkoxy carbonyl, $R_3$, $R_4$, $R_5$, and $R_6$ comprise H, halogen atoms, alkyl, aralkyl, disubstituted amino, or heterocyclic ring containing O, S, or N, $R_7$ and $R_8$ comprise H or alkyl, W comprises nitrogen with or without $Z_1$ and $Z_2$ or aromatic group without $Z_1$ and $Z_2$, Y comprises carbon, oxygen, sulfur, selenium, —NR, or —C(CH$_3$)$_2$, m is 1~3, n is 1~18, and $X_1$ and $X_2$ are the same or different and comprise an anion or an anionic organometallic complex, wherein $R_3$ and $R_4$ are joined to a nitrogen atom or $R_5$ and $R_6$ are joined together to form a ring, and R bonded to nitrogen is $C_{1-5}$ alkyl.

The invention provides a high density recording medium comprising a first substrate, a recording layer formed thereon comprising the disclosed bisstyryl compound, a reflective layer formed on the recording layer, and a second substrate formed on the reflective layer.

The invention provides another high density recording medium comprising a first substrate, a reflective layer formed thereon, a recording layer formed on the reflective layer comprising the disclosed bisstyryl compound, and a protective layer formed on the recording layer.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawing, which are given by way of illustration only, and thus are not limitative of the present invention, and wherein.

DETAILED DESCRIPTION

The invention provides a bisstyryl compound having formula (I):

In formula (I), $Z_1$ and $Z_2$ are the same or different such as benzene, naphthalene, and heterocyclic ring containing O, S, or N, such as furan, pyrazine, pyrrole, pyrazole, pyridazine, pyridine, pyridone, pyrimidine, thiazole, thiophene, quinine, and isoquinine.

$R_1$ may comprise H, $C_{1-5}$ alkyl, hydroxyl, halogen atoms, or alkoxy. $R_2$ may comprise H, halogen atoms, $C_{1-5}$ alkyl, nitro, ester, carboxyl, sulfo, sulfonamide, sulfuric ester, amide, $C_{1-3}$ alkoxy, amino, alkylamino, cyano, $C_{1-6}$ alkylsulfonyl, or $C_{2-7}$ alkoxy carbonyl.

$R_3$, $R_4$, $R_5$, and $R_6$ may comprise H, halogen atoms, alkyl, aralkyl, disubstituted amino, or heterocyclic ring containing O, S, or N. $R_3$ and $R_4$ may be joined to a Nitrogen atom or $R_5$ and $R_6$ may be joined together to form a ring. Substituted groups in $R_3$, $R_4$, $R_5$, and $R_6$ may comprise H, halogen atoms, alkyl, alkyl halide, nitro, cyano, hydroxyl, carboxyl, ester, sulfo, sulfuric ester, or sulfoamide.

$R_7$ and $R_8$ may comprise H or alkyl. W may be nitrogen atom with or without $Z_1$ and $Z_2$ or aromatic group without $Z_1$ and $Z_2$. Y may be carbon, oxygen, sulfur, selenium, —NR, or —C(CH$_3$)$_2$, wherein R is $C_{1-5}$ alkyl. m is 1-3, n is 1-18, and $X_1$ and $X_2$ may be anionic groups or anionic organometallic complexes, such as halogen atoms, $ClO_4^-$, $BF_4^-$, $PF_6^-$, $BPh_4^-$, $SbF_6^-$, tetracyano p-quinodimethane ($TCNQ^-$), tetracyano ethylene ($TCNE^-$), benzene sulfonate, The disclosed bisstyryl compound has an absorbing wavelength of about 300-550 nm, an absorbing coefficient ($\epsilon$) exceeding $10^4$, and solubility exceeding 1% in organic solvent, such as $C_{1-6}$ alcohol, $C_{1-6}$ ketone, $C_{1-6}$ ether, dibutyl ether (DBE), halide, and amide.

The bis(styryl) compounds provided by the invention comprise

The compound of formula (I) is prepared as follows. First, a compound such as

, or

, solvent such as ethanol or methanol, and a aldehyde compound such as N,N,-dimethylformaldehyde, N,N-dibutyl-formaldehyde, N,N-dimethylpropanal, or

OHC—N⟨ ⟩O, are added to a flask and reacted for 20-24 hours at 80-100° C. A bisstyryl compound is prepared after extracting solvent. The bisstyryl compound, solvent such as methanol or ethanol, and a metal salt, an anionic organometallic complex or an oxonol are added to a flask and reacted overnight at 80-100° C. The metal salt may comprise Li, Na, or K salt such as $NaSbF_6$, $NaClO_4$, or $NaPF_6$. The anionic organometallic complex may comprise or After cooling to room temperature and filtration, a bisstyryl compound is produced.

The invention also provides a high density recording medium comprising a first substrate, a recording layer formed thereon comprising the disclosed bisstyryl compound, a reflective layer formed on the recording layer, and a second substrate formed on the reflective layer.

The invention further provides another high density recording medium comprising a first substrate, a reflective layer formed thereon, a recording layer formed on the reflective layer comprising the disclosed bis(styryl) compound, and protective layer formed on the recording layer.

The first substrate is a transparent substrate having trenches. The second substrate is a transparent substrate without trenches. The first and second substrates may comprise polyester, polycarbonate ester, polyolefin, or metallocene based cyclic olefin copolymer. The recording layer has a thickness of about 50-300 nm and may further comprise cyanine dye, azo metal chelate compounds, or oxonol compounds. The bisstyryl compound and cyanine dye, azo metal chelate compounds, or oxonol compounds have a weight ratio of about 1:99-99:1. The reflective layer may comprise Au, Ag, Al, Si, Cu, Cr, Ti, or alloys thereof.

The high density recording medium has a reflectance of above 30%. The high density recording medium may comprise a high density Disk-Recordable (HD DVD-R and BD-R).

A method of fabricating a high density recording medium is also provided. A first substrate is provided and a solution containing a bisstyryl compound and solvent is prepared simultaneously. The solvent may comprise $C_{1-6}$ alcohol, $C_{1-6}$ ketone, $C_{1-6}$ ether, dibutyl ether (DBE), halide, or amide. The $C_{1-6}$ alcohol may be methanol, ethanol, isopropanol, diacetone alcohol (DAA), 2,2,3,3-tetrafluoropropanol (TFP), trichloroethanol, 2-chloroethanol, octafluoropentanol, or hexafluorobutanol. The $C_{1-6}$ ketone may be acetone, methyl isobutyl ketone (MIBK), methyl ethyl ketone (MEK), or 3-hydroxy-3-methyl-2-butanone. The halide may be chloro- form, dichloromethane, or 1-chlorobutane. The amide may be dimethyl formamide (DMF), dimethyl acetamide (DMA), or methyl cyclohexane (MCH). The solution is then coated on the first substrate and dried to form a recording layer, utilizing spin coating, vacuum deposition, spray coating, immersion coating, stick coating, fluid coating, print coating, or tape coating, preferably spin coating. Next, a reflective layer is sputtered on the recording layer. Finally, a second substrate is bonded to the reflective layer to form a high density recording medium, utilizing spin coating, printing coating, thermal melted-glue, or double-faced tape bonding. A protective layer may be coated on the reflective layer before the second substrate is bonded.

Another method of fabricating a high density recording medium is further provided. A first substrate is provided and a solution containing a bisstyryl compound and solvent is prepared simultaneously. The solvent may comprise $C_{1-6}$ alcohol, $C_{1-6}$ ketone, $C_{1-6}$ ether, dibutyl ether (DBE), halide, or amide. The $C_{1-6}$ alcohol may be methanol, ethanol, isopropanol, diacetone alcohol (DAA), 2,2,3,3-tetrafluoropropanol (TFP), trichloroethanol, 2-chloroethanol, octafluoropentanol, or hexafluorobutanol. The $C_{1-6}$ ketone may be acetone, methyl isobutyl ketone (MIBK), methyl ethyl ketone (MEK), or 3-hydroxy-3-methyl-2-butanone. The halide may be chloroform, dichloromethane, or 1-chlorobutane. The amide may be dimethyl formamide (DMF), dimethyl acetamide (DMA), or methyl cyclohexane (MCH). A reflective layer is sputtered on the first substrate. The solution is then coated on the reflective layer and dried to form a recording layer, utilizing spin coating, vacuum deposition, spray coating, immersion coating, stick coating, fluid coating, print coating, or tape coating, preferably spin coating. Finally, a protective layer is coated on the recording layer to form a high density recording medium.

EXAMPLES

Example 1

Preparation of Compound 1

6.28 g, 2.92 g N,N-dimethylformaldehyde, and 50 ml methanol were added to a flask with thermal reflux overnight. After cooling to room temperature and filtration, 4.13 g brown compound 1 was prepared with yield of 56%. Compound 1 had a maximum absorbing wavelength of 367 nm in methanol.

Example 2

Preparation of Compound 2

7.38 g compound 1, 2.44 g $NaClO_4$, and 50 ml methanol were added to a flask with thermal reflux overnight. After cooling to room temperature and filtration, 6.01 g brown compound 2 was prepared with yield of 88%. Compound 2 had a maximum absorbing wavelength of 367 nm in methanol.

Example 3

Preparation of Compound 3

12.56 g,

9.20 g, and 50 ml methanol were added to a flask with thermal reflux overnight. After cooling to room temperature and filtration, 13.05 g brown solid compound was prepared. 8.22 g brown solid compound, 5.16 g NaSbF$_6$, and 50 ml methanol were added to a flask with thermal reflux overnight. After cooling to room temperature and filtration, 9.36 g red-brown compound 3 was prepared with yield of 90%. Compound 3 had a maximum absorbing wavelength of 372 nm in methanol.

Example 4

Preparation of Compound 4

14.22 g,

9.21 g and 50 ml methanol were added to a flask with thermal reflux overnight. After cooling to room temperature and filtration, 15.94 g brown solid compound was prepared. 9.45 g brown solid compound, 5.16 g NaSbF$_6$, and 50 ml methanol were added to a flask with thermal reflux overnight. After cooling to room temperature and filtration, 10.6 g red-brown compound 4 was prepared with yield of 90%. Compound 4 had a maximum absorbing wavelength of 373 nm in methanol.

Example 5

Preparation of Compound 5

14.22 g, 12.58 g N,N-dibutylformaldehyde, and 50 ml methanol were added to a flask with thermal reflux overnight. After cooling to room temperature and filtration, 15.93 g brown solid compound was prepared. 10.29 g brown solid compound, 3.35 g NaPF$_6$, and 50 ml methanol were added to a flask with thermal reflux overnight. After cooling to room temperature and filtration, 9.62 g red-brown compound 5 was prepared with yield of 89%. Compound 5 had a maximum absorbing wavelength of 370 nm in methanol.

Example 6

Preparation of Compound 6

13.94 g

5.85 g N,N-dimethylformaldehyde, and 50 ml methanol were added to a flask with thermal reflux overnight. After cooling to room temperature and filtration, 14.2 μg brown solid compound was prepared. 8.07 g brown solid compound, 2.44 g NaClO$_4$, and 50 ml methanol were added to a flask with thermal reflux overnight. After cooling to room temperature and filtration, 6.62 g brown compound 6 was prepared with yield of 88%. Compound 6 had a maximum absorbing wavelength of 368 nm in methanol.

Example 7

Preparation of Compound 7

13.94 g,

12.58 g N,N-dibutylformaldehyde, and 50 ml methanol were added to a flask with thermal reflux overnight. After cooling to room temperature and filtration, 16.58 g brown solid compound was prepared. 9.74 g brown solid compound, 5.16 g NaSbF$_6$, and 50 ml methanol were added to a flask with thermal reflux overnight. After cooling to room temperature and filtration, 10.74 g brown compound 7 was prepared with yield of 90%. Compound 7 had a maximum absorbing wavelength of 370 nm in methanol.

Example 8

Preparation of Compound 8

13.94 g, 7.93 g 3-(Dimethylamino) acrolein, and 50 ml methanol were added to a flask with thermal reflux overnight. After cooling to room temperature and filtration, 13.38 g green solid compound was prepared. 7.60 g green solid compound, 6.47 g $NaSbF_6$, and 50 ml methanol were added to a flask with thermal reflux overnight. After cooling to room temperature and filtration, 8.62 g green compound 8 was prepared with yield of 80%. Compound 8 had a maximum absorbing wavelength of 468 nm in methanol.

Example 9

Preparation of Compound 9

7.93 g 3-(Dimethylamino)acrolein, and 50 ml methanol were added to a flask with thermal reflux overnight. After cooling to room temperature and filtration, 11.75 g green solid compound was prepared. 6.91 g green solid compound, 4.20 g $NaPF_6$, and 50 ml methanol were added to a flask with thermal reflux overnight. After cooling to room temperature and filtration, 7.03 g green compound 9 was prepared with yield of 85%. Compound 9 had a maximum absorbing wavelength of 472 nm in methanol.

Example 10

Preparation of Compound 10

11.92 g 5.84 g N,N-dimethylformaldehyde, and 50 ml methanol were added to a flask with thermal reflux overnight. After cooling to room temperature and filtration, 12.15 g brown solid compound was prepared. 7.06 g brown solid compound, 3.35 g NaPF$_6$, and 50 ml methanol were added to a flask with thermal reflux overnight. After cooling to room temperature and filtration, 6.46 g brown compound 10 was prepared with yield of 87%. Compound 10 had a maximum absorbing wavelength of 370 nm in methanol.

Example 11

Preparation of Compound 11

11.92 g

7.93 g 3-(Dimethylamino)acrolein, and 50 ml methanol were added to a flask with thermal reflux overnight. After cooling to room temperature and filtration, 13.35 g green solid compound was prepared. 7.58 g green solid compound, 4.20 g NaPF$_6$, and 50 ml methanol were added to a flask with thermal reflux overnight. After cooling to room temperature and filtration, 6.99 g green compound 11 was prepared with yield of 88%. Compound 11 had a maximum absorbing wavelength of 469 nm in methanol.

Maximum absorbing wavelengths ($\lambda_{max}$), absorbing coefficient ($\epsilon$), degradation temperature (° C.), and reflectance (%) of compounds 1-11 are shown in Table 1.

TABLE 1

| Compounds | Maximum absorbing wavelengths (nm) | | Absorbing coefficient ($\times 10^4$) | Degradation temperature (° C.) | Reflectance (%) |
|---|---|---|---|---|---|
| | methanol | film | | | |
| 1 | 367 | 375 | 8.32 | 243.8 | 52 |
| 2 | 367 | 375 | 8.49 | 263.5 | 53 |
| 3 | 372 | 378 | 6.92 | 191.8 | 51 |
| 4 | 373 | 379 | 7.55 | 232.4 | 52 |
| 5 | 370 | 377 | 7.02 | 185.5 | 52 |
| 6 | 368 | 377 | 7.23 | 205.7 | 51 |
| 7 | 370 | 379 | 8.03 | 245.8 | 50 |
| 8 | 468 | 477 | 7.78 | 210.5 | 50 |
| 9 | 472 | 480 | 7.53 | 208.6 | 52 |
| 10 | 370 | 378 | 8.22 | 258.6 | 51 |
| 11 | 469 | 478 | 7.88 | 212.3 | 53 |

The bisstyryl compounds provided by the invention comprise

-continued

-continued

-continued

Example 12

Fabrication of High Density Recording Medium (1)

Figure 1:
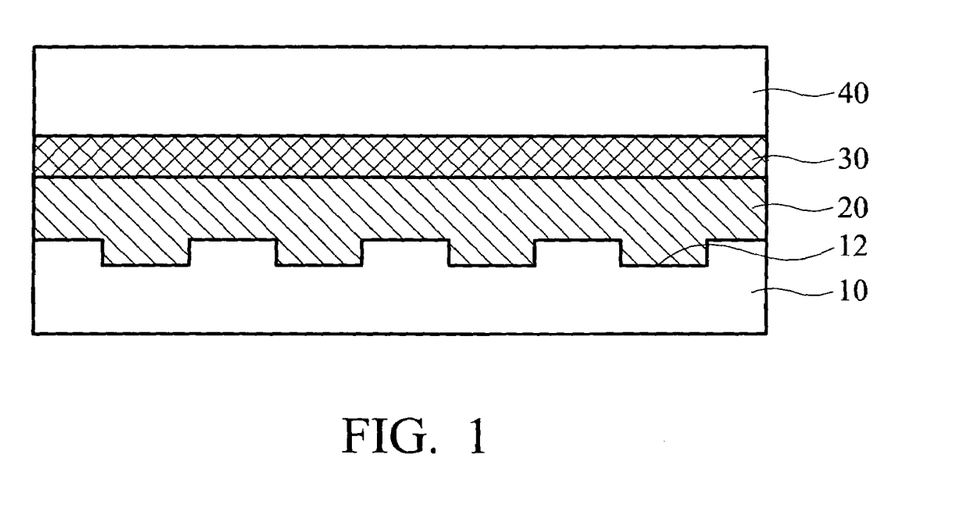
FIG. 1 is a cross section of a high density recording medium of the invention.

Referring to FIG. 1, a method of fabricating a high density recording medium is disclosed according to the following example, in which a polycarbonate ester first substrate 10 at a diameter of 120 mm and a thickness of 0.6 mm having trenches 12 at a depth of 83 nm and a width of 220 nm was provided. A solution (1.5 wt %) containing a compound 2 and 2,2,3,3-tetrafluoropropanol (TFP) was prepared simultaneously. Next, the solution was coated on the first substrate 10 by spin coating and dried at 80° C. for 5 min to form a recording layer 20. An Ag layer was then sputtered on the recording layer 20 to form a reflective layer 30 at a thickness of 150 nm. Finally, a second substrate 40 was bonded to the reflective layer 30 to form a blue-laser high density recording medium. A UV resin was coated on the reflective layer 30 to form a protective layer of about 10 μm (not shown) before the second substrate 40 was bonded. The disk had a reflectance of about 53% under 405 nm.

Example 13

Fabrication of High Density Recording Medium (2)

Figure 2:
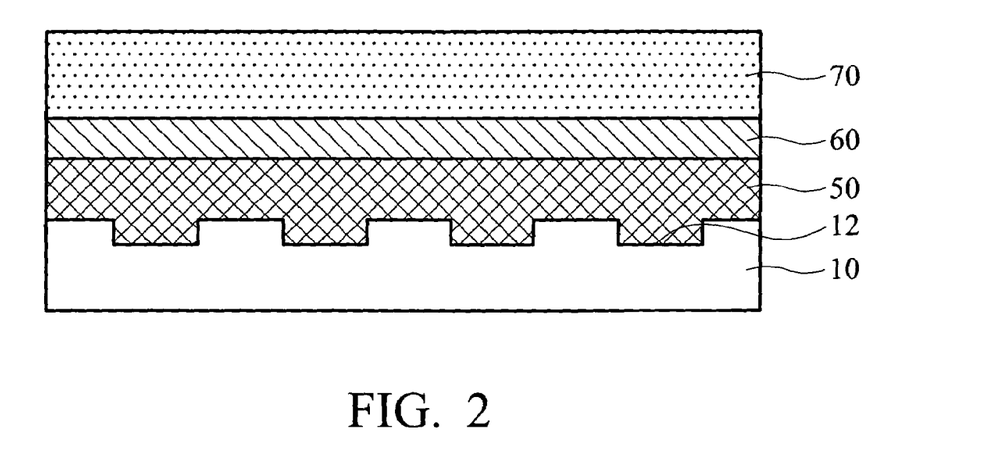
FIG. 2 is a cross section of another high density recording medium of the invention.

Referring to FIG. 2, another method of fabricating a high density recording medium is disclosed according to the following example, in which a polycarbonate ester first substrate 10 at a diameter of 120 mm and a thickness of 0.6 mm having trenches 12 at a depth of 83 nm and a width of 220 nm was provided. A solution (1.5 wt %) containing a compound 5 and 2,2,3,3-tetrafluoropropanol (TFP) was prepared simultaneously. An Ag layer was then sputtered on the first substrate 10 to form a reflective layer 50 at a thickness of 150 nm. Next, the solution was coated on the reflective layer 50 by spin coating and dried at 80° C. for 5 min to form a recording layer 60. Finally, a UV resin was coated on the recording layer 60 to form a protective layer 70 of about 10 μm. The disk had a reflectance of about 52% under 405 nm.

The blue-laser high density recording media with modified recording layer of the invention provides better reflectance than related products (about 45%). The media also provide high recording sensitivity and high carrier-to-noise ratio (CNR).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A bisstyryl compound of the formula (I):

wherein $Z_1$ and $Z_2$ are the same or different and are benzene, naphthalene, or heterocyclic ring containing O, S, or N, $R_1$ is H, $C_{1-5}$ alkyl, hydroxyl, halogen, or alkoxy, $R_2$ is H, halogen, $C_{1-5}$ alkyl, nitro, ester, carboxyl, sulfo, sulfonamide, sulfuric ester, amide, $C_{1-3}$ alkoxy, amino, alkylamino, cyano, $C_{1-6}$ alkylsulfonyl, or $C_{2-7}$ alkoxy carbonyl, $R_3$, $R_4$, $R_5$, and $R_6$ are H, halogen, substituted or unsubstituted alkyl, aralkyl, or heterocyclic ring containing O, S, or N, W is nitrogen with or without $Z_1$ and $Z_2$, Y is C—$R_7R_8$, oxygen, sulfur, selenium, or —NR—, m is 1~3, n is 1~18, and $X_1$ and $X_2$ are the same or different and are an anion or an anionic organometallic complex, wherein $R_3$ and $R_4$ are joined to a nitrogen atom or $R_5$ and $R_6$ are joined together to form a ring, $R_7$ and $R_8$ are H or alkyl, and R bonded to nitrogen is $C_{1-5}$ alkyl.

2. The bisstyryl compound as claimed in claim 1, wherein substitutes of $R_3$, $R_4$, $R_5$, and $R_6$ are halogen, alkyl, alkyl halide, nitro, cyano, hydroxyl, carboxyl, ester, sulfo, sulfuric ester, or sulfoamide.

3. The bisstyryl compound as claimed in claim 1, wherein $X_1$ and $X_2$ are halogen, $ClO_4^-$, $BF_4^-$, $PF_6^-$, $BPh_4^-$, $SbF_6^-$, tetracyano p-quinodimethane (TCNQ$^-$), tetracyano ethylene (TCNE$^-$), benzene sulfonate, 4. The bisstyryl compound as claimed in claim 1, wherein the bisstyryl compound has an absorbing wavelength of about 300-550 nm.

5. The bisstyryl compound as claimed in claim 1, wherein the bisstyryl compound has solubility exceeding 1% in organic solvent.

6. The bisstyryl compound as claimed in claim 5, wherein the organic solvent is $C_{1-6}$ alcohol, $C_{1-6}$ ketone, $C_{1-6}$ ether, dibutyl ether (DBE), halide, or amide.

7. A high density recording medium, comprising:
   a first substrate;
   a recording layer formed on the first substrate comprising a bisstyryl compound as claimed in claim 1;
   a reflective layer formed on the recording layer; and
   a second substrate formed on the reflective layer.

8. The high density recording medium as claimed in claim 7, wherein the first and second substrates are polyester, polycarbonate ester, polyolefin, or metallocene based cyclic olefin copolymer.

9. The high density recording medium as claimed in claim 7, wherein the recording layer is cyanine dye, azo metal chelate compounds, or oxonol compounds.

10. The high density recording medium as claimed in claim 9, wherein the bisstyryl compound and cyanine dye, azo metal chelate compounds, or oxonol compounds have a weight ratio of about 1:99-99:1.

11. The high density recording medium as claimed in claim 7, wherein the reflective layer is Au, Ag, Al, Si, Cu, Cr, Ti, or alloys thereof.

12. The high density recording medium as claimed in claim 7, wherein the recording layer is formed on the first substrate by spin coating, vacuum deposition, spray coating, immersion coating, stick coating, fluid coating, printing coating, or tape coating.

13. A high density recording medium, comprising:
a first substrate;
a reflective layer formed on the first substrate;
a recording layer formed on the reflective layer comprising a bisstyryl compound as claimed in claim 1; and
a protective layer formed on the recording layer.

14. The high density recording medium as claimed in claim 13, wherein the first and second substrates are polyester, polycarbonate ester, polyolefin, or metallocene based cyclic olefin copolymer.

15. The high density recording medium as claimed in claim 13, wherein the reflective layer is Au, Ag, Al, Si, Cu, Cr, Ti, or alloys thereof.

16. The high density recording medium as claimed in claim 13, wherein the recording layer is cyanine dye, azo metal chelate compounds, or oxonol compounds.

17. The high density recording medium as claimed in claim 16, wherein the bisstyryl compound and cyanine dye, azo metal chelate compounds, or oxonol compounds have a weight ratio of about 1:99-99:1.

18. The high density recording medium as claimed in claim 13, wherein the recording layer is formed on the first substrate by spin coating, vacuum deposition, spray coating, immersion coating, stick coating, fluid coating, print coating, or tape coating.

* * * * *

UNITED STATES PATENT AND TRADEMARK OFFICE
CERTIFICATE OF CORRECTION

PATENT NO.      : 7,598,360 B2
APPLICATION NO. : 11/254663
DATED           : October 6, 2009
INVENTOR(S)     : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 332 days.

Signed and Sealed this

Twenty-eighth Day of September, 2010

David J. Kappos
*Director of the United States Patent and Trademark Office*